(No Model.)
C. A. KINNEY.
WHEEL HUB.
No. 378,842. Patented Feb. 28, 1888.
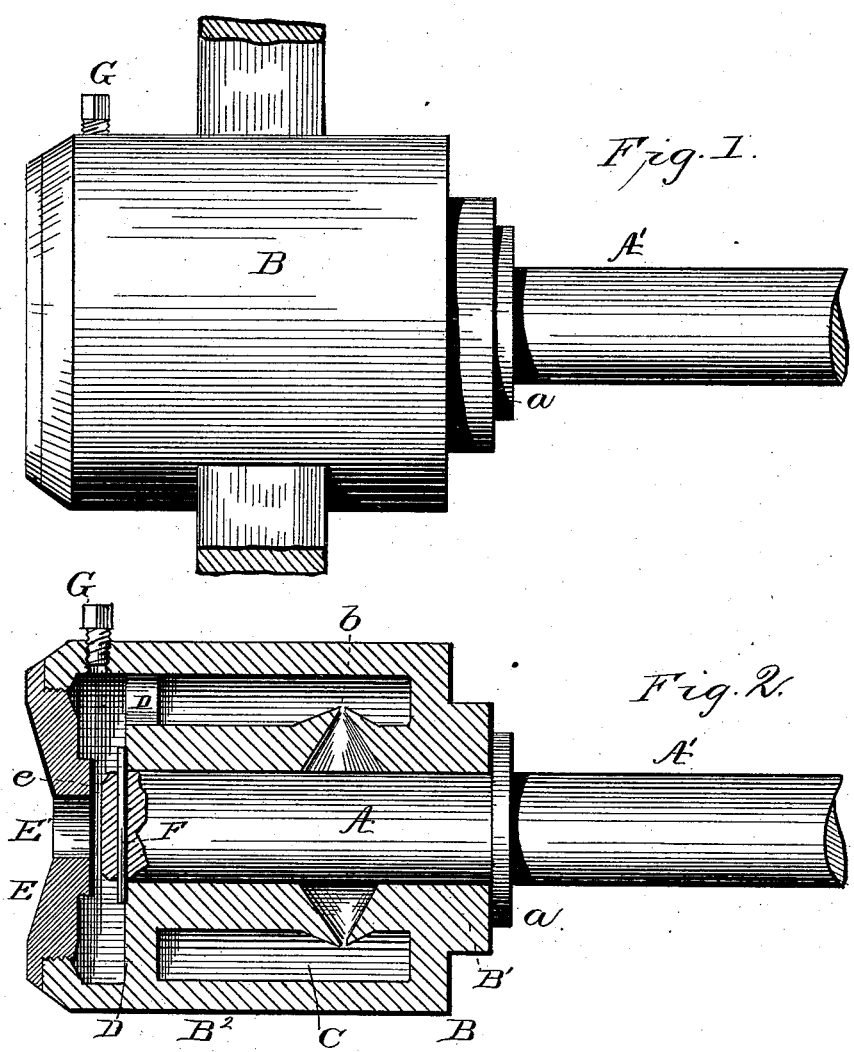
Witnesses:
J. M. Reynolds,
L. C. Hills.
Inventor
Charles A. Kinney,
By his attorney,
James C. Boyce
N. PETERS. Photo-Lithographer, Washington, D. C.

UNITED STATES PATENT OFFICE.

CHARLES A. KINNEY, OF RAYMILTON, ASSIGNOR OF ONE-THIRD TO BRYAN H. OSBORN, OF FRANKLIN, PENNSYLVANIA.

WHEEL-HUB

SPECIFICATION forming part of Letters Patent No. 378,842, dated February 28, 1888.

Application filed October 17, 1883. Renewed August 15, 1887. Serial No. 246,962. (No model.)

*To all whom it may concern:*

Be it known that I, CHARLES A. KINNEY, a citizen of the United States, residing at Raymilton, in the county of Venango and State of Pennsylvania, have invented certain new and useful Improvements in Self-Lubricating Hubs, of which the following is a specification, reference being had therein to the accompanying drawings.

The object of my invention is to provide a self-lubricating hub adapted to be used with wheels or pulleys of any kind which are mounted on the ends of shafts or axles.

My invention consists, first, in casting the hub proper and with an outer jacket and an oil-bearing chamber between said hub and jacket in a single piece of metal, in combination with a removable cap having a central aperture communicating with said chamber; second, in constructing the orifices which conduct the oil from the oil-chamber to the spindle of a conical form, the largest part of said orifices next to said spindle and the walls of the upper part of said orifices continued some distance within the oil-chamber in order to form buckets or carriers to lift the oil from the oil-bearing space; third, in constructing an inwardly-beveled hub-cap provided with a central orifice of smaller diameter than the diameter of the spindle, and having an inwardly-extending annular flange about said orifice, whereby the lubricating substance is prevented from escaping; and, fourth, in other details of construction, all of which will be hereinafter more fully set forth.

In the drawings, Figure 1 represents an elevation of the hub broken away from the wheel; Fig. 2, a median section of said hub.

A represents the spindle, and A' the axle of the wheel. Between said axle and spindle is cast the usual collar or annular flange, $a$. Upon the spindle revolves my improved hub B. Said hub consists of the hub proper, or bearing portion, B', and the jacket $B^2$, between which is formed the oil-chamber C. Said bearing portion, B', and jacket $B^2$ are made integral at their inner extremities, and at their outer extremities are connected by radial braces or ties D, also cast integral with the aforesaid parts B' $B^2$. The jacket $B^2$ extends outwardly some distance beyond the bearing portion B', and is provided with internal screw-threads, in which register the external threads of the hub-cap E. Said hub-cap E may be inwardly beveled toward its center, and is provided with a central orifice, E', of somewhat less diameter than the spindle A. About said orifice, on its inner side, is formed an annular flange, $e$, whereby the oil is prevented from escaping from the hub. Within the hub proper, or bearing portion, B', are formed two or more oil-conducting orifices, $b$. Said orifices are of conical form, having their largest diameter next the spindle A. At their outer smaller ends they have extensions continued within the oil-chamber, so as to create carriers or buckets, whereby the oil is lifted from the oil-chamber and carried on its course from the chamber to the spindle. The spindle A extends beyond the bearing portion B' of the hub, and is provided with the usual linchpin, F. On or near the same plane with said linchpin the jacket $B^2$ is provided with a screw-plug, G, which when removed allows the linchpin F to be inserted or withdrawn.

The operation of my improved hub is as follows: The hub is passed over the spindle up to the collar $a$. The plug G being withdrawn, the linchpin F is inserted. By removing the cap E the chamber C may be filled, if desired, with cotton waste; but I do not regard this as necessary. The cap E having been then screwed on, oil may be forced through the orifice E', and is conducted downward and enters the chamber C between the supports D. As the hub revolves, the oil becomes distributed around the chamber C, and runs into the orifices $b$ and passes from thence to the spindle A. By the construction of the cap E with its internal flange, $e$, it will be seen that as the hub turns the oil, in dropping, is invariably caught and prevented from escaping from the orifice E'. Oil may be supplied sufficiently to touch the bottom of the spindle before it will pass out of the orifice E'. As the orifice E' is in the center of the hub, and therefore in the center of rotation, oil may be supplied while the wheel or pulley is in motion. The inward bevel of the cap E forms a protection of the orifice E' from falling dirt or water, and it may, if deemed necessary, be fitted with a plug for the better protection of the chamber from dirt.

Having thus described my invention, what I claim is—

1. The cap E, having a concaved exterior and a central aperture, in combination with a hub which is provided with a lubricating-chamber that receives oil from said aperture and supplies it to the spindle, substantially as set forth.

2. The hub proper and outer jacket, in one piece, having a chamber, C, between them, and provided with perforations communicating with the axle-spindle in conical projections into said chamber, in combination with a cap, E, having a concave exterior and a central aperture through which oil is supplied to said chamber, substantially as set forth.

3. In a lubricating-hub, the combination, with the pin F, of the plug G, located nearly over said pin, whereby said pin may be inserted or removed, in the manner and for the purposes set forth.

CHARLES A. KINNEY.

Witnesses:
B. H. OSBORN,
JAMES MILLER.